UNITED STATES PATENT OFFICE.

JOHANNES THIELE, OF MUNICH, ASSIGNOR TO THE BADISCHE ANILIN AND SODA FABRIK, OF LUDWIGSHAFEN, GERMANY.

AMIDO-TETRAZOTIC ACID AND PROCESS OF MAKING SAME.

SPECIFICATION forming part of Letters Patent No. 546,604, dated September 17, 1895.

Application filed October 30, 1894. Serial No. 527,478. (Specimens.) Patented in Germany September 20, 1891, No. 65,584; in France January 22, 1892, No. 218,855, and in England February 4, 1892, No. 2,194.

*To all whom it may concern:*

Be it known that I, JOHANNES THIELE, doctor of philosophy, a subject of the King of Bavaria, residing at Munich, in the Kingdom of Bavaria and Empire of Germany, have invented new and useful Improvements in the Manufacture of Amido-Tetrazotic Acid, (for which patents have been obtained in Germany, No. 65,584, dated September 20, 1891; in England, No. 2,194, dated February 4, 1892, and in France, No. 218,855, dated January 22, 1892,) of which the following is a specification.

My present invention relates to my discovery that amido-guanidin can, by treatment with nitrous acid, be converted into diazoguanidin, and this by suitable treatment—say, with sodium acetate—yields my new compound amido-tetrazotic acid. This can be used in the manufacture of coloring-matters and in other ways. The production of the said amido-guanidin and its conversion into diazo-guanidin nitrate are described in the English Letters Patent No. 6,786/91, and in the *Annalen der Chemie*, Vol. 270, pages 1 to 63. In the latter publication the following formula is assigned to diazo-guanidin nitrate:

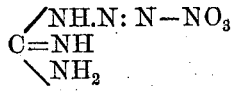

and the following equation is there given as representing its conversion into amido-tetrazotic acid:

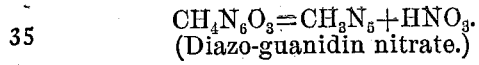
(Diazo-guanidin nitrate.)

The following example will serve to illustrate the manner in which my invention can best be carried into practical effect. Mix together a solution of one molecular proportion of amido-guanidin (or an equivalent quantity of a salt thereof) with a mineral acid—say, sulfuric acid—taking so much acid that one equivalent of free mineral acid is present; then run in a solution of one molecular proportion of sodium nitrate, taking care that the temperature of the solution does not rise high enough to cause the decomposition of the product formed. The temperature must not be permitted to rise above 40° to 45° centigrade. The solution thus obtained contains the desired diazo-guanidin, which can, if desired, be isolated in the form of a salt. Thus in case it be desired to obtain the nitrate of diazoguanidin, a salt which readily crystallizes, this can be effected by treating the nitrate of guanidin in the manner described in the above example, and using nitric acid as the mineral acid, then on treating with nitrous acid the nitrate of diazo-guanidin is formed in solution and is obtained as a crystalline residue, when the solution is evaporated at a low temperature. This product can be recrystallized from alcohol and obtained in the form of white crystals melting at about 129° centigrade. The nitrous acid can be led into the liquid in the gaseous form, or introduced in any other way, instead of producing it in the solution, as hereinbefore described.

No claim is made in this specification to the diazo-guanidin and its salts.

The following directions afford a good and typical method of effecting the conversion of diazo-guanidin into my new amido-tetrazotic acid. To a solution of diazo-guanidin (obtained as above described or in any other way) add sufficient sodium acetate to convert all the diazo-guanidin into the acetate thereof, and concentrate the solution by evaporation. The acetate of diazo-guanidin decomposes under this treatment, forming acetic acid and the new product, amido-tetrazotic acid. On cooling, a solution which has been sufficiently concentrated, crystals of this new amido-acid are obtained and can be purified by recrystallization from water. On heating it loses its water of crystallization and yields a product melting at about 198° to 199° centigrade. Instead of the sodium acetate employed in the above example other acetates can be used, and other salts which in this respect act in a similar manner—such as, for instance, certain salts of other organic acids, certain borates, carbonates, oxids, and hydrates of the heavy metals and of magnesium, and finally ammonia can also be used.

When employing the compounds of the heavy metals—such as, for instance, copper— which yield insoluble salts with tetrazotic acid, it is advisable to take twice the quantity of metallic compound described in the above example, so that all the tetrazotic acid is obtained in the form of the insoluble metallic compound. The tetrazotic acid can then be set free and isolated in any suitable way—such as by treatment with a stronger acid, or in the case of copper or similar compounds by the aid of sulphureted hydrogen.

My new amido-tetrazotic acid is a crystalline compound readily soluble in water, but it is precipitated from its solutions by copper salts. On treating with nitrous acid it is converted into a diazo compound which yields azo-dyes upon union with amido or phenolic bodies.

In this specification I have given no definite formula for my new amido-tetrazotic acid and no equation for its formation because of the uncertainty which attaches thereto. My initial material diazo guanidin-nitrate differs from the class of diazo compounds in being stable and not explosive and in not readily yielding azo compounds with aromatic amido or phenolic bodies. This renders its chemical nature doubtful and all formulas or equations deduced therefrom uncertain.

Now, what I claim is—

1. The process for the production of amido-tetrazotic acid which process consists in exposing diazo-guanidin to the action of a compound possessing weakly alkaline properties such for example as sodium acetate, and then concentrating the solution by evaporation, substantially as described.

2. As a new article of manufacture, the amido-tetrazotic acid which can be derived from diazo guanidin and sodium acetate and which appears in the form of a white crystalline body soluble in water, but is precipitated from its solution by copper salts, and yields a diazo compound on treatment with nitrous acid, all substantially as herein described.

In testimony whereof I have hereunto set my hand in the presence of two subscribing witnesses.

JOHANNES THIELE.

Witnesses:
   OTTO L. STANGE,
   OTTO DIMVICLY.